United States Patent [19]
Winthrop

[11] 4,055,379
[45] Oct. 25, 1977

[54] MULTIFOCAL LENS

[75] Inventor: John Talley Winthrop, Wellesley, Mass.

[73] Assignee: American Optical Corporation, Southbridge, Mass.

[21] Appl. No.: 638,870

[22] Filed: Dec. 8, 1975

Related U.S. Application Data

[63] Continuation-in-part of Ser. No. 389,044, Aug. 16, 1973, abandoned.

[51] Int. Cl.² .............................................. G02C 7/06
[52] U.S. Cl. ..................................... 351/171; 351/169
[58] Field of Search .............................. 351/168–172, 351/176, 177

[56] References Cited

U.S. PATENT DOCUMENTS

| | | | |
|---|---|---|---|
| 1,271,356 | 7/1918 | Paige | 351/171 |
| 1,351,785 | 9/1920 | Paige | 351/168 |
| 1,588,559 | 6/1926 | Tillyer | 351/176 |
| 2,743,649 | 5/1956 | Phillips | 351/171 |
| 2,847,804 | 8/1958 | Calkins et al. | 351/177 X |
| 2,869,422 | 1/1959 | Maitenaz | 351/169 |
| 2,878,721 | 3/1959 | Kanolt | 351/169 |
| 3,687,528 | 8/1972 | Maitenaz | 351/169 |
| 3,711,191 | 1/1973 | Tagnon | 351/169 |
| 3,785,724 | 1/1974 | Maitenaz | 351/169 |
| 3,910,691 | 10/1975 | Maitenaz | 351/169 |

Primary Examiner—David H. Rubin
Attorney, Agent, or Firm—Howard R. Berkenstock, Jr.

[57] ABSTRACT

A multifocal ophthalmic lens is described on which one refractive surface is formed to provide a plurality of vertically juxtaposed viewing zones each of which has constant dioptric focal power. The constant dioptric focal power in the various zones increases successively from top to bottom of the multifocal ophthalmic lens. The refractive surface in the zones other than the viewing zone having the lowest focal power at the top of the lens is divided into a plurality of laterally disposed areas. In those areas near the periphery of the lens, the lens is provided with an aspheric surface formed from sections of a figure of revolution such that the principal axes of astigmatism lie in vertical and horizontal planes so that a wearer of the multifocal ophthalmic lens continues to perceive horizontal lines as being horizontal and vertical lines as being vertical and unbroken. However, the height of the ledge which exists between the various zones is restricted to a minimum height over the entire width of the lens which may then be blended during the manufacturing process into the adjacent viewing zones such that the dividing lines between the various viewing zones are rendered invisible.

10 Claims, 28 Drawing Figures

| | TOTAL AMOUNT OF DISCONTINUOUS POWER VARIATION $b_1+b_2$ (DIOPTERS) | | | | | | | | | |
|---|---|---|---|---|---|---|---|---|---|---|
| | | 0 | 0.25 | 0.5 | 0.75 | 1.0 | 1.5 | 2.0 | 2.5 | 3.0 | 3.5 |
| TOTAL ADDITION B (DIOPTERS) | 0.5 | 20 / 0 | 40 / 100 | ∞ / ∞ | | | | | | | |
| | 1.0 | 10 / 0 | 13 / 30 | 20 / 100 | 40 / 300 | ∞ / ∞ | | | | | |
| | 1.5 | 6.6 / 0 | 8 / 21 | 10 / 51 | 13.3 / 100 | 20 / 200 | ∞ / ∞ | | | | |
| | 2.0 | 5 / 0 | 5.6 / 12 | 6.6 / 30 | 8 / 56 | 10 / 100 | 20 / 300 | ∞ / ∞ | | | |
| | 2.5 | 4 / 0 | 4.4 / 10 | 5 / 25 | 5.7 / 42 | 6.6 / 65 | 10 / 150 | 20 / 400 | ∞ / ∞ | | |
| | 3.0 | 3.3 / 0 | 3.6 / 9 | 4 / 18 | 4.3 / 30 | 5 / 52 | 6.6 / 100 | 10 / 200 | 20 / 500 | ∞ / ∞ | |
| | 3.5 | 2.9 / 0 | 3.1 / 7 | 3.3 / 14 | 3.6 / 25 | 4 / 39 | 5 / 73 | 6.6 / 130 | 10 / 249 | 20 / 600 | ∞ / ∞ |

11.7723

9.6024 9.7044 10.0111 10.5249 11.2510

7.6897 7.7892 8.0886 8.5900 9.2973 10.2162 11.3542

6.0161 6.1136 6.4068 6.8978 7.5903 8.4895 9.6024 10.9385

4.5671 4.6630 4.9511 5.4334 6.1136 6.9964 8.0886 9.3989 10.9385

3.3315 3.4259 3.7097 4.1850 4.8549 5.7242 6.7994 8.0886 9.6024 11.3542

2.2998 2.3931 2.6735 3.1430 3.8046 4.6630 5.7242 6.9964 8.4895 10.2162

1.4648 1.5572 1.8349 2.2998 2.9549 3.8046 4.8549 6.1136 7.5903 9.2973 11.2501

0.8209 0.9126 1.1883 1.6497 2.2998 3.1430 4.1850 5.4334 6.8978 8.5900 10.5249

0.3639 0.4551 0.7293 1.1883 1.8349 2.6735 3.7097 4.9511 6.4068 8.0886 10.0111

0.0908 0.1817 0.4551 0.9162 1.5572 2.3931 3.4259 4.6630 6.1136 7.7892 9.7044

0.0000 0.0908 0.3639 0.8209 1.4648 2.2998 3.3315 4.5671 6.0161 7.6897 9.6024 11.7723

0.1169 0.2341 0.5869 1.0527 1.7013 2.5446 3.5902 4.8480 6.3310 8.0558 10.0437

0.4691 0.5869 0.9416 1.5368 2.3791 3.2051 4.2614 5.5327 7.0322 8.7773 10.7900

1.0602 1.1790 1.5368 2.1374 2.9874 4.0379 5.1874 6.4796 8.0026 9.7765 11.8248

1.8965 2.0168 2.3791 2.9874 3.8487 4.9732 6.2597 7.7072 9.3203 11.1373 13.2360

2.9874 3.1098 3.4782 4.0969 4.9732 6.1179 7.5083 9.0813 10.8494 12.8313

4.3460 4.4709 4.8472 5.4794 6.3752 7.5463 9.0090 10.6902 12.5938 14.7386

5.9897 6.1179 6.5042 7.1535 8.0741 9.2789 10.7855 12.5849 14.6274

7.9417 8.0741 8.4730 9.1438 10.0959 11.3432 12.9059 14.8113

10.2331 10.3707 10.7855 11.4835 12.4754 13.7770 15.4113

12.9059 13.0501 13.4851 14.2179 15.2607

16.0183

650-200-200  
$R_D = 88.113$ mm  
$R_I = 68.440$  
$R_R = 68.440$

| X | $Y_1$ | $Y_2$ |
|---|---|---|
| 0 | 0 | 0 |
| 6.8 | 14.0 | 14.0 |
| 13.6 | 17.5 | 28.0 |

FIG. 26

MULTIFOCAL LENS

CROSS-REFERENCES TO RELATED APPLICATIONS

This application is a continuation-in-part of co-pending patent application Ser. No. 389,044, filed Aug. 16, 1973, now abandoned and further relates to co-pending applications Ser. No. 389,042 and Ser. No. 389,043 entitled "Progressive Power Ophthalmic Lens," both applications being filed on Aug. 16, 1973 and both now abandoned.

BACKGROUND OF THE INVENTION

This invention is related to ophthalmic lenses in general and is more particularly concerned with novel progressive power and multifocal ophthalmic lenses in which the distortion is either so controlled that a wearer perceives vertical lines as vertical throughout most of the viewing area of the ophthalmic lens or the degree of distortion is severely diminished.

The human eye is a sensitive yet relatively simple organ. It contains a lens on the outer surface for receiving light from various objects in the field of view of the eye. A retina is positioned behind the lens to serve as a viewing screen for those rays focused by the lens onto the retina. A series of muscles surround the lens and act upon the lens to increase or decrease its curvature and focal length in order to focus upon objects which are either near to the eye or at a distance. When the normal eye views relatively distant objects, the lens and the muscles are in a relaxed position. In this position, the ideal lens has the proper curvature on its surface to focus the distant object on the retina. Upon the observance of objects at close range, the eye muscles act on the lens to increase its curvature and decrease the focal length of the lens sufficiently to focus the image of the near object onto the retina. This ability of the eye to adjust itself for varying object distances is commonly known as "accommodation". As the age of a human being increases, his power of accommodation generally decreases. This results from the fact that the eye muscles become stiff and weak. For example, a child can normally change the focal power of his eye by at least 14 diopters. In a middle age person, the power of accomodation is often reduced to about 3 diopters, and in old age, the power of accomodation may disappear entirely.

For a long time, scientists and optical engineers have attempted to find solutions to this problem of decreasing accomodation with age. Probable the most common means which has been devised for treating this condition is to construct the corrective ophthalmic lens utilized by the person with decreased accomodation with a plurality of spherical surfaces. These are commonly known as bifocal and trifocal lenses depending upon whether the lens in question contains two or three spherical portions. In the bifocal lens, two separate segments of different dioptric focal powers are provided. The power of one segment is such that vision through it permits focusing on nearby objects such as reading matter while the other segment corrects the vision for viewing distant objects. In a trifocal ophthalmic lens a third spherical segment is interposed between the previously mentioned two segments to provide a measure of clear vision to the wearer intermediate between the dioptric focal powers of the distance and reading segments of the lens. The other surface of the multifocal ophthalmic lens is then provided with either a spherical or toric surface designed specifically to adapt the multifocal lens to the particular ophthalmic prescription of the wearer.

Certain major difficulties are, however, encountered by the users of multifocal ophthalmic lenses. Firstly, there is a line of sharp demarcation optically between the various segments of the multifocal lens. When the line of sight scans across this dividing line, a "jump" usually occurs in the image perceived by the wearer. It is difficult for the wearer to become accustomed to this sensation and to make allowances for it in normal life. Secondly, persons having severely reduced accomodation are unable to focus clearly on objects lying at distances between those distances at which the various segments are designed to focus. Thirdly, particularly in younger people having reduced accomodation powers, it is often difficult to convince some individuals that they require multifocal ophthalmic lenses for vision purposes. This is generally attributed to the fact that decreased accomodation is associated with oncoming age. The standard multifocal lens has a distinct line of demarcation between the various segments which is readily apparent to people in the vicinity of the wearer. Therefore, as well as the optical problems which exist with multifocal ophthalmic lenses, also certain cosmetic problems exist.

The obvious general solution to these problems is to place an intermediate viewing zone between the distance viewing zone and the reading zone which progresses in dioptric focal power from that of the distance viewing portion to that of the reading portion. By attempting this solution, an ophthalmic lens is provided in which both the optical and cosmetic problems may be solved in that there are neithe lines of optical jump between distinct segments nor are there cosmetically obivous lines between the various segments. Furthermore, all intermediate focal powers between the distance and reading portions are provided such that the wearer is able to perceive objects at any distance clearly through a portion of this intermediate zone. Such a lens is known commonly as a progressively power ophthalmic lens. An excellent survey of such lenses was provided by A. G. Bennett in the October and November 1970, and February and March 1971 issues of The Optician. IN this work, the various attempts are discussed which have been made to provide such progressive power ophthalmic lenses by various scientists and optical engineers over approximately the last 70 years.

All progressive power lenses of the prior art have suffered from at least one common failing. As a necessary concomitant of an aspherical surface such as is found in the progressive power lenses, a certain amount of astigmatism and distortion is inherently found in the refractive surface, particularly in the peripheral portions of the transitional zone. The distortion causes a swimming or rocking effect when the wearer's head is moved within a visual environment. This effect has served to cause many wearers of such ophthalmic lenses to become nauseated and has definitely prevented the wide acceptance of this type of eyewear. Furthermore, the astigmatism causes blurring of vision through the affected areas of the lens. This effect is, of course, objectionable as well.

Distortion occurs whenever astigmatism is present in the refracting surface. Thus distortion, like astigmatism, is an inevitable consequence of progressive power refractive ophthalmic surfaces. Many attempts have been made in the prior art to minimize the effect of astigmatism. Generally, these attempts have centered on the scheme by which the refractive surface having the aspherical curvature is generated. The more successful attempts have resulted in spreading the astigmatism over a large portion of the refractive surface. This, at a minimum, reduced the size of the reading zone below that which allows the wearer to read standard material without turning his head.

SUMMARY OF THE INVENTION

Accordingly, it is an object of the present invention to provide a new and novel multifocal lens in which the dividing lines between the various segments are rendered invisible. It is another object of the present invention to provide such a novel multifocal ophthalmic lens which is relatively simple in construction and capable of large quantity manufacture.

Briefly, the invention in its broadest aspect comprises a multifocal ophthalmic lens having a refractive surface thereon. The refractive surface is characterized by a smooth, unbroken principal meridional curve lying along the refractive surface in a generally vertical direction. The principal meridional curve divides the refractive surface into two similar lateral portions. The curvature of the principal meridional curve varies to provide a predetermined plurality of levels of constant dioptric focal power according to a predetermined law. The surface is thereby divided into a like plurality of viewing zones in verticl juxtaposition, each pair of juxtaposed viewing zones having a boundary therebetween. The uppermost viewing zone has a first constant dioptric focal power and is adapted for viewing distant objects over the full width of the multifocal ophthalmic lens. The remaining viewing zones are each divided into at least three horizontally distributed areas. The center area in each of the remaining viewing zones is of a constant dioptric focal power at the principal meridional curve in the viewing zone juxtaposed thereabove. The two outermost of the three areas in each of the remaining viewing zones is of such a spherical curvature that at a boundary the relative height of the viewing zones forming the boundary are constant along the boundary throughout the width of each outermost area and are so corrected optically for skew distortion that at each point therein the principal axes of astigmatism lie in vertical and horizontal planes so that a wearer of the lens receives horizontal and vertical lines in the visual environment as being horizontal and vertical. The boundaries between the adjacent viewing zones are blended so that they are rendered invisible.

The instant application is distinguished from above-identified related applications Ser. Nos. 389,042 and 389,043 at least by the feature that the instant application is directed inter alia to lens structure that does not have continuously variable optical power zones along the principal vertical meridian.

Further objects, advantages and features of the invention will be apparent in the arrangement and construction of the constituent parts, in detail, as set forth in the following specification taken together with the accompanying drawing.

DESCRIPTION OF THE DRAWING

In the drawing,

FIGS. 14A through 14C are exemplary power law diagrams illustrating the use of discontinuities;

FIG. 26 is an exemplary embodiment of a surface shape which may be provided upon a slumping block used to produce a mold for casting a lens of the type depicted by the coordinate system of FIG. 25.

DETAILED DESCRIPTION OF THE PREFERRED EMBODIMENTS

Figure 1:
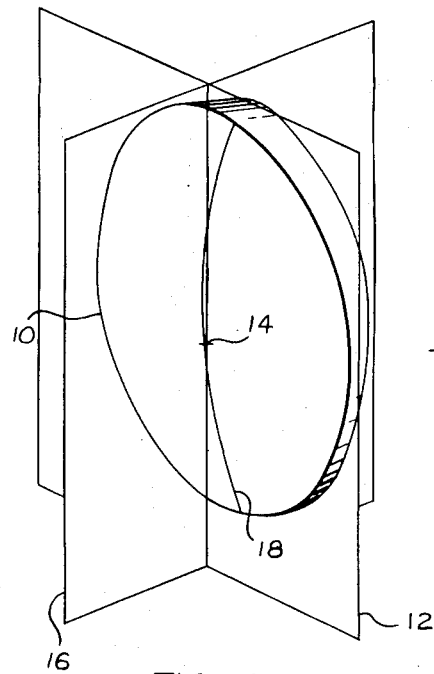
FIG. 1 is an isometric view of a progressive power ophthalmic lens according to the invention.

In referring to the various figures of the drawing herebelow, like reference numerals will be utilized to refer to identical parts.

Referring initially to FIG. 1, there is shown a progressive power ophthalmic lens 10. The lens is constructed of an optical material having a uniform refractive index such as optical quality glass or one of the well-known optical quality plastic materials such as CR-39 (allyl diglycol carbonate), Lexan (polycarbonate), or methyl methacrylate. Progressive power is accomplished in the lens 10 by forming one of the two surfaces into an appropriate aspherical form. Generally, the surface utilized for forming the aspherical surface is the front surface of the lens, i.e., that surface of the lens which is of convex form. However, the principal reason for this choice is that conventional grinding and polishing machinery located at various dispensing branches is configured to apply the spherical or toroidal surface dictated by the intended wearer's particular ophthalmic prescription on the rear surface of the ophthalmic lens. Therefore, in this introductory portion as well as the remainder of the following description of the invention, the aspherical surface will be shown and described as being present as the front surface of the ophthalmic lens. Although it is not intended that the invention be so limited.

For purposes of this description, the progressive power ophthalmic lens 10 is fixed in space in approximately the orientation in which it is to be worn by the patient. More particularly, as shown in FIG. 1, the lens 10 is oriented such that the aspherical surface is tangent to a first vertically oriented plane 12 at the geometrical center 14 of the lens blank 10. A second vertically oriented plane 16, perpendicular to the first vertically oriented plane 12, also intersects the ophthalmic lens 10 at point 14 and divides the lens 10 into two symmetrical halves. The plane 16 is generally referred to as the principal vertical meridional plane. The principal vertical meridional plane 16 intersects the aspherical surface of the lens 10 in a plane curve 18 called the principal meridional line or curve.

If the progressive power ophthalmic lens 10 is to work properly, the principal meridional line 18 must be continuous and it must have continuously varying slope. The first condition ensures that there will be no visible discontinuity in the surface of the lens at the principal meridional line. The second condition ensures that there wil be no image jump as the wearer's line of sight moves vertically along the principal meridional line. In order to provide for progressive accommodation in the lens, the curvature of the principal meridional line 18 increases in a downwardly positive manner from a far vision value near the top of the lens to a near vision value near the bottom. Depending upon the requirements of the particular design, the amount of dioptric focal power addition between the upper and lower limits (commonly known as "add") may vary appreciably. The absolute amount of dioptric focal power addition is variable and is dependent upon the retained powers of accommodation on the part of the wearer. The rate of addition along the principal meridional line 18 is also variable. In other words, the transitional dioptric focal power may be introduced over a very short portion of the principal meridional line or it may be introduced over essentially the entire length of the principal meridional line.

In general, it is preferred that the astigmatism along the principal meridional line 18 be essentially zero. Astigmatism is generally defined with respect to a point on a refractive surface and two perpendicularly disposed planes intersecting thereat and passing through the normal to the refractive surface at the point, the first or sagittal plane established by the minimum radius of curvature of the refractive surface and the second or meridional plane established by the maximum radium of curvature of the refractive surface at the point; then the magnitude of the astigmatism is taken as the difference between the dioptric focal power of the refractive surface in the first plane and the dioptric focal power of the lens in the second plane. The amount of astigmatism at any point on the refractive surface of the lens is measured by the difference in the dioptric focal power between the sagittal plane and the meridional plane of the point. The curvatures of the refractive surface at any point in the sagittal and meridional planes are commonly known as the principal curvatures at that point. This astigmatism could be called intrinsic in order to distinguish it from that astigmatism that arises when a spherical surface is illuminated by rays of light striking the surface at oblique angles of incidence.

Along the vertical principal meridional curve 18, the refractive surface is umbilic, i.e., there is only a single radius of curvature at any given point. If $r$ is the radius of curvature of the principal meridional line at Q, and $n$ is the index of refraction of the lens material, then, if the principal curvatures of the surface at $Q$ are equal, the dioptric focal power $P_0$ at this point is given by $$P_0 = (n - 1/r)$$

Figure 2:
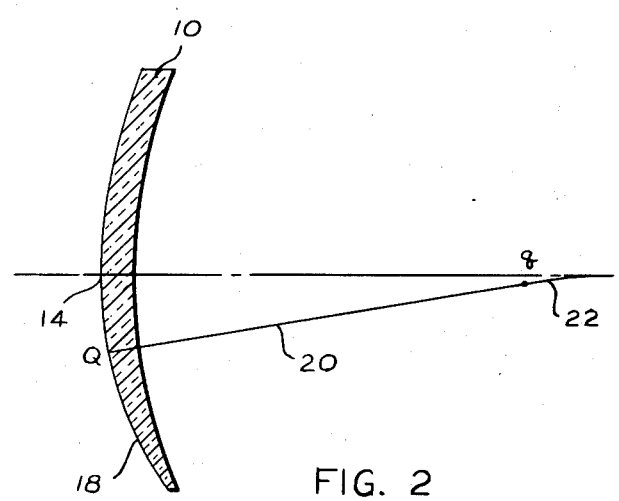
FIG. 2 is a vertical sectional view of the progressive power ophthalmic lens of FIG. 1 taken along the principal vertical meridional curve.

Referring now to FIG. 2, there is shown a sectional view of the lens 10 taken along the principal vertical meridional plane 16. The locus of the centers of curvature of the principal meridional line 18 comprises a continuous plane curve 22 called the evolute of the principal meridional line which is also located within the principal meridional plane. To each point Q of the principal meridional line 18 there corresponds a point $q$ on the evolute. The radius vector 20 connecting any two such points is perpendicular to the principal meridional line 18 at Q and tangent to the evolute curve 22 at $q$.

Figure 3:
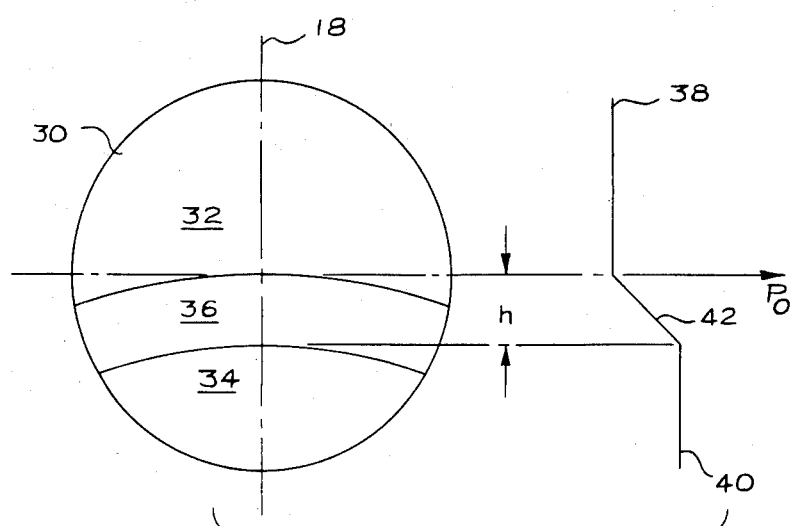
FIG. 3 is a front elevation view of a progressive power ophthalmic lens showing the various viewing zones and the associated power law.

A typical and particularly useful form of progressive power ophthalmic lens incorporating the foregoing principles is shown in FIG. 3. The lens 30 consists of three vertically disposed viewing zones 32, 36, and 34 respectively. Here again, a principal meridional line 18 bisects the lens in a generally vertical direction. The uppermost viewing zone of the lens 32 is formed with a constant dioptric focal power which accommodates vision to distant objects, i.e., the surface in viewing zone 32 is spherical. The lowermost viewing zone 34 of the lens is again of constant dioptric focal power and accommodates the vision to nearby objects. Interposed between viewing zones 32 and 34 is an intermediate viewing zone 36 having progressive power which provides a gradual optical transition between viewing zones 32 and 34. In other words, the dioptric focal power varies continuously over a range from a first dioptric focal power at the top of the intermediate viewing zone to a second, higher dioptric focal power at the bottom of the zone. This is consistent with the requirement that the dioptric focal power increase generally from top to bottom of the progressive power ophthalmic lens along the principal meridional curve.

The height of the intermediate portion of the lens along the meridional curve is identified as $h$. The graph at the right of FIG. 3 is known as the "power law" of the lens 30. The power law in this instance consists of three linear portions 38, 40, and 42 which are respecitvely associated with the lens viewing zones 32, 34, and 36 respectively along the principal meridional line B. The portion 38 represents the constant dioptric focal power in the viewing zone 32 and the portion 40 represents the constant dioptric focal power in the viewing zone 34, the constant dioptric focal power in the portion 40 being of a greater magnitude than that in the portion 32. The sloping portion 42 of the power law defines that the dioptric focal power through the intermediate area 36 changes at a constant rate. This is a typical type of power law often utilized in progressive power ophthalmic lenses. Of course, the height $h$ is variable and may be increased to the full height of the lens.

The power law shown in FIG. 3 is linear through the progressive power viewing zone. The power law need not be linear and may be of any arbitrary character as required by a particular application. It should, however, be a continuous curve through the progressive power viewing zone although it is not intended that minor discontinuities should be excluded from the scope of the invention.

Figure 4:
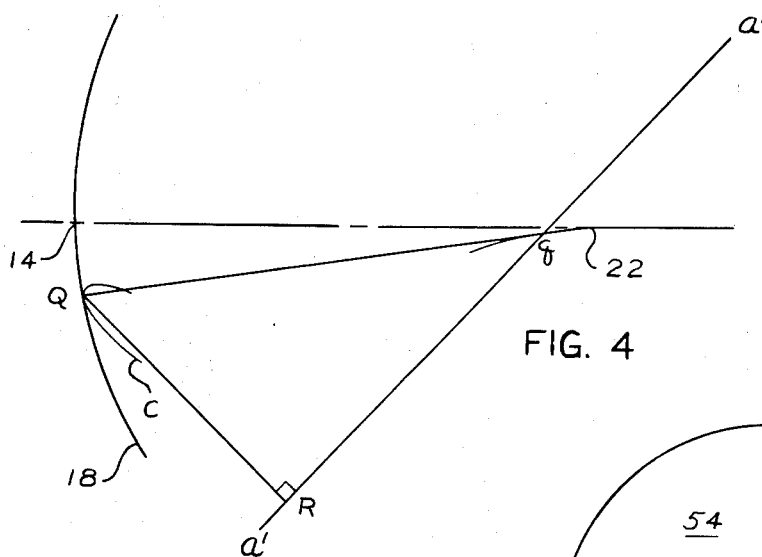
FIG. 4 is schematic illustration of the technique for generating the progressive power surface of FIG. 3.

The basic construction of the progressive power surface of FIG. 3 is shown in FIG. 4. This construction, however, does not incorporate per se the novel features of the present invention which will be described herebelow. The progressive power refractive surface is generated by a circular arc C of variable radius and constant inclination which passes successively through all points Q of the principal merdional line. The axis $aa'$ of the generating circle lies in the principal meridional plane, and makes a constant angle with the vertical. The radius vector Qq defines point $q$ on the evolute for a given point Q of the principal meridional line. The radius QR of the generating circle passing through a given point Q is determined by the condition that its axis $aa'$ pass through the corresponding point $q$ of the evolute 22. The radius of the generating circle equals the length of the line segment QR of FIG. 4.

It can be shown that, as a consequence of this construction, the principal curvatures at each point of the principal meridional line are equal. In other words, the surface is umbilic (free of astigmatism at the principal meridional line).

It is convenient to describe the distortive properties of a refractive surface such as those associated with the present invention in terms of the image of a square grid as seen through the lens. While not totally accurate, this test is a reasonable approximation of the visual affect gained by wearer of the resulting ophthalmic lens.

Two general types of distortion can be distinguished, normal and skew. Normal distortion refers to the unequal image magnification in the two orthogonal directions parallel to the lines of the grid. Skew distortion refers to a departure from the orthogonality of the original grid lines. Suppose that a single square of such a grid is viewed through a small area of a given ophthalmic lens. If the principal axes of astigmatism in that area of the lens are parallel to the lines of the grid being viewed, then the image perceived shows pure normal distortion, i.e., the image of the grid square is a rectangle whose sides are parallel to those of the square. If the principal axes of astigmatism in the that area of the lens bisect the right angle between the respective orthogonal grid lines, then the image shows pure skew distortion, i.e., the image of the square is an equilaterial parallelogram. In the general case, where the principal axes of astigmatism have arbitrary orientation with respect to the lines of the object grid, the image of the square perceived will exhibit a combination of normal and skew distortion, i.e., the image will be a non-equilateral parallelgram.

Of the foregoing two specific types of distortion, skew distortion is by far the more objectionable in ophthalmic applications. In an ophthalmic lens, skew distortion produces a sensation of rocking and swaying with respect to the environment. In most instances, the rocking and swaying effect results in disorientation and nausea on the part ofthe wearer. The prior art progressive power and variable ophthalmic lenses were either totally uncorrected for skew distortion, resulted in only a partial correction for skew distortion, or resulted in a reading area too small for general use.

The astigmatism present in a refractive surface, for a linear power law, varies laterally at twice the rate of addition of focal power along the principal meridional curve. Therefore, unless correction or compensation for distortion in undertaken in the peripheral areas of the ophthalmic lens utilizing progressive power, considerable distortion is necessarily present in the surface. For example, in the form of progressive lens shown in FIG. 3 of the drawing, the principal axes of astigmatism form a 45° anglewith respect to the horizontal and vertical lines of the visual environment throughout the intermediate area 36. Therefore, these lenses give rise to substantial amounts of skew and normal distortion in the peripheral areas of the intermediate area 36.

As has been state above, as is the case with astigmatism in such progressive power refractive surfaces, it is not possible to eliminate distortion in the surface. It has been discovered, however, that it is entirely possible to construct an ophthalmic surface which in the peripheral areas is totally corrected for skew distortion. That is to say, the principal axes of astigmatism in the periphera areas may be caused to lie in horizontal and vertical planes with respect to the visual environment such that only normal distortion occurs in these peripheral zones. This normal distortion is far less objectionable than the skew distortion and the incorporation of this aspect into a progressive power lens forms one of the principle features of the present invention.

This corrected condition of the refractive surface in the peripheral areas for skew distortion can be most easily expressed mathmetically by letting the lens surface be tangent to the X-Y plane at the origin of the coordinate system, where the X-axis points downward in the direction of increasing optical power, and by assuming that the surface is represented by the following expression:

$$Z = f(x,y) \tag{1}$$

when $y$ and $x$ are the horizontal and vertical directions respectively and Z is the height of the surface from the $xy$ plane, i.e., Z can be represented by:

$$Z = f(x,y) = g - (r^2 - u^2 - v^2)^{\frac{1}{2}} \qquad (3)$$

$$\text{where: } g = r_D + \int_0^x (1 - Q^2)^{\frac{1}{2}} \frac{dr}{dx} dx \qquad (4)$$

$$u = rQ \qquad (5)$$

$$Q = \int_0^x \frac{dx}{r} \qquad (6)$$

$r_D$ = distance viewing zone meridional radius, $r$ = meridional radius of curvature, and $v$ = various mathematical expressions dependent upon the portion or area of the lens surface being described.

The lens surface of the present invention is divided into viewing zones and areas within some of those zones. In the upper half circle of the lens body, the far-vision or distance zone is provided. In accordance with the mathematics of the specification, where $r$ is the meridional radius of curvature, in this zone $r = r_D$ and $v = y$.

In the intermediate zone of height $h$ (the progressively-varying optical power zone), $r = (1/r_D + bx)^{-1}$, where $b = (1/h)(1/r_R - 1/r_D)$, and where $r_R$ is the reading or near vision meridional radius. Thus, in the near vision zone, $r = r_R$.

By way of further explanation, in the intermediate and near vision zones, there are three mathematical expressions for $v$, depending on the area. In the area bisected by the vertical meridional line, $v = y$. In the outermost areas from the vertical meridional line, $v$ is expressed as:

$$v = \left\{ \frac{r}{r_D} y^2 + (1 - \frac{r}{r_D}) n \right\}^{\frac{1}{2}}$$

And in the two "blending" areas that lie between the outermost areas and the central area, $v$ is expressed as:

$$v = \left\{ Y^2 - (1 - \frac{r}{r_D}) [1 (Y - Y_1)^3 - m(Y - Y_1)^4] \right\}^{\frac{1}{2}}$$

where:

$$1 = \frac{2}{3} \cdot \frac{(2y_2 + y_1)}{(y_2 - y_1)}$$

$$m = \frac{1}{2} \cdot \frac{(y_2 + y_1)}{(y_2 - y_1)^3}$$

$$n = \frac{1}{6} (y_1^2 + 4y_1y_2 + y_2^2)$$

If the surface has the condition that the directions of principal curvatures, the principal axis of astigmatism, at all points lie in planes which are parallel to the $x$ and $y$ axes, then $$\frac{\delta^2 f}{\delta x \delta y} + 0. \qquad (2)$$

When this expression is satisfied for all points in a given area, only pure normal distortion may be perceived through the lens.

This partial derivative expression can be alternatively viewed as $$\left( \frac{\delta}{\delta x} \right) \left( \frac{\delta}{\delta y} \right) f(x,y). \qquad (7)$$

The two above partial derivative operators can be shown, by mathematical tensor analysis which need not be repeated here to fully comprehend the present invention, to be substantially proportional to the cosines of angles between surface grid lines, e.g., the grid lines of FIGS. 6–11. An angle for which the cosine is zero, as required by equation (2), is 90°, the orthogonality angle. Thus, when partial derivative expression (2) is satisfied, orthogonality is provided and skew distortion is virtually eliminated; vertical and horizontal lines in the visual environment appear to the wearer of the lens having this correction as vertical and horizontal respectively.

Yet another way of viewing the substantial significance of equations (1) and (2) is to appreciate first that in general cylindrical lens surfaces with vertical and horizontal mutually orthogonal axes provide no skew distortion, and second that for these orthogonally-oriented cylinders with their axes co-linear with the Y and X coordinates axes respectively, equation (1) can be separated into:

$$Z = f(x,y) = f_1(x) + f_2(y) \qquad (8)$$

where $f_1(x)$ is a function only of the $x$ variable and $f_2(y)$ is a different function only of the $y$ varible. By operating on equation (8) with the operators of equation (7) one necessarily obtains zero, since:

$$\frac{\delta f_2(y)}{\delta x} = 0, \text{ and } \frac{\delta f_1(x)}{\delta y} = 0. \qquad (9)$$

Thus, the zero condition of equation (2) implies the cylindrical axial orthogonality condition which provides zero skew distortion.

Figure 5:
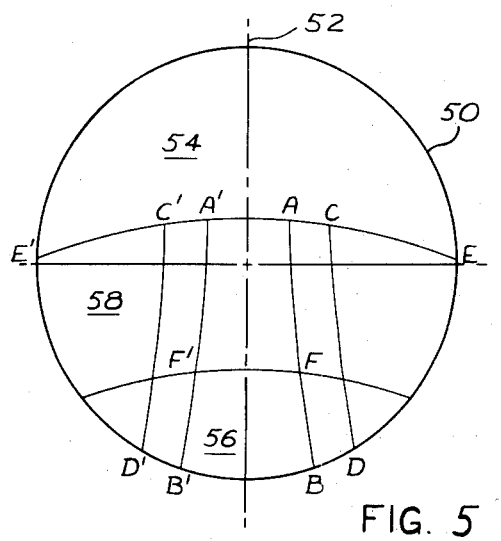
FIG. 5 is a front elevation view of a progressive power ophthalmic lens whose intermediate and near vision portions are divided laterally into a plurality of areas, the outermost of which are totally corrected for skew distortion.

Referring now to FIG. 5 of the drawing, there is shown a progressive power ophthalmic lens 50 according to the present invention. A principal meridional line 52 bisects the lens in a generally vertical direction. Once again, the lens 50 is divided into three juxtaposed viewing zones 54, 58, and 56 respectively one above the other. The uppermost viewing zone 54 is formed with a refractive surface having a constant dioptric focal power to accommodate for distant vision. The lower viewing zone 56, in the central regions thereof, is formed with a second, higher constant dioptric focal power surface adapted for near vision. The intermediate zone 58 which is disposed between the near and far viewing zones 54 and 56, respectively, provides progressive transitional dioptric focal power therebetween. As described thus far, the lens of the invention is not appreciably different from those of the prior art. The technique for generating the lens in the portions adjacent to the principal meridional curve is that described with reference to FIG. 4. The meridional power law is of any generally acceptable form such as that shown in FIG. 3.

In the intermediate and near vision zones 58 and 56, the refractive surface of the progressive power ens 50 is further subdivided laterally into five areas. The dividing lines between these areas AB, CD, A'B', and C'D', are chosen arbitarily with respect to shape and position.

Although illustrated as being symmetrical with respect to the principal meridional curve 52, this is not a condition of the invention. In the present embodiment, the dividing lines A'F'B' and C'D' may be mirror images of AFB and CD with respect to the principal meridional line 52. The central area A'AFF' is formed in accordance with any chosen progressive power ophthalmic lens design.

The peripheral areas of the refractive surface CDE and C'D'E' are constructed to connect smoothly to the far vision viewing zone 54 aong the lines CE and C'E'. The smooth optical connection is achieved by having a smooth unbroken surface over the entire lens. At each point in areas CDE and C'D'E', the principal axes of astigmatism lie in horizontal and vertical planes according to the foregoing expression. It follows that, when viewed through these peripheral areas of the progressive power ophthalmic lens, the horizontal and vertical lines within the visual environment are not subjected to skew distortion. Furthermore, when viewed through the periphery of the lens a vertical line will remain vertical and unbroken throughout the total height of the periphery of the lens. In other words, a line which is viewed as vertical in the peripheral portions of the far vision viewing zone 54 continues vertical and unbroken in the intermediate viewing zone 58 and the near vision viewing zone 56.

The intermediate regions ABCD and A'B'D'C' are areas of optical blending between the central portion and the skew distortion corrected peripheral portions of the ophthalmic lens 50. The purpose of these areas is to provide a smooth optical connection between these areas of diverse optical functions. Once again, these areas also connect smoothly to the far vision area 54. The precise choice of refractive surface configuration within these areas of blend depends on a great number of factors. These include the amount of add present in the lens, the overall width of the lens, and the height of the intermediate progressive power viewing zone 58.

As noted earlier, the principal axes of astigmatism lie in planes at 45° to the vertical in the center progressive power area when the power law is linea therein. Also the principal axe of astigmatism in the peripheral areas CDE and C'D'E' are in vertical and horizontal planes. In other words, the distortion in the center is pure skew distortion and in the periphery, pure normal distortion. The areas of blending ABCD and A'B'D'C' have aspherical surfaces which serve to transform the orientation of the principal axes of astigmatism between the other areas smoothly so that discontinuities are not introduced into the surface of image. The width of the areas of blend is, however, variable and may as a limiting case be reduced to zero. In other words, the purview of the invention extends to those cases where there are only the central and peripheral areas present in the refractive surface.

It is also within the purview of the invention that the peripheral areas CDE and C'D'E' may actually fall outside the area of the lens, in which case the blending areas ABCD and A'B'D'C' become, in effect, the peripheries of the lens. The areas CDE and C'D'E' serve the purpose of providing a basis for defining the form of the areas ABDC and A'B'D'C'. A lens having this form does not completely correct for skew distortion in the peripheral areas of the lens. The effect of skew distortion is, however, softened in comparison with that found in the lens of FIG. 3. The advantage of such a lens is that it can be made to have only monotonically changing curvatures. This means that, although a skew distortion is not entirely corrected, the lens nevertheless, shows a smooth lateral optical effect.

When respect to the following examples, the basic differences between the surfaces are illustrated in the drawing by the differences in the distortion present in the image of a square grid. In each of the following cases, only one-half of the image is presented, the other hand being essentially identical therewith.

Figure 6:
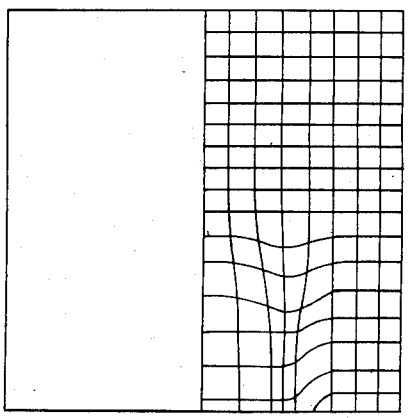
FIGS. 6 through 11 are illustrative diagrams of the images of a square grid as viewed through various embodiments of the progressive power ophthalmic lens of the present invention.

Referring initially to FIG. 6 of the drawing, the peripheral areas of the intermediate and near vision viewing zones have aspherical curvature of the same radius and center as the constant dioptric focal power far vision viewing zone. This is a limiting case where the criteria previously set forth for the peripheral areas is satisfied by a continuation of the upper spherical surface into the lower reaches of the progressive power ophthalmic lens. There is, therefore, no distortion or astigmatism attributable to progressive power which exists in these peripheral areas of the lens. On the other hand, the blending areas intermediate between the central progressive power area and the peripheral areas contain large amounts of distortion when the grid is viewed through them.

Figure 7:
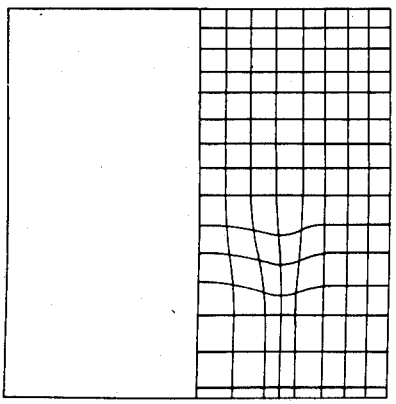

The refractive surface depicted by the image of FIG. 7 is formed so that the variation in vertical magnification in the peripheral areas of the lens is identical to the variation of vertical magnification along the principal meridional line. Therefore, the distortion of a horizontal line or the grid as seen through the lens is such that the lens of the line at the periphery is identical to its level at the principal meridional line. The astigmatism which is present at any level of the periphery is equal to the rate of add at the principal meridional line at the same level. The distortion produced by the blending between the central area of the lens and the peripheral areas is considerably less than is produced in the limiting case lens of FIG. 6.

Figure 8:
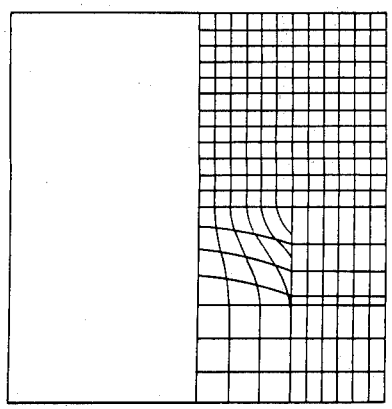

FIG. 8 shows the image of a limiting example according to the present invention. Here, the width of the blending regions is reduced to essentially zero. Thus, the downward curving lines of the intermediate progressive power area turn abruptly horizontal at the periphery of the central area. This design minimizes the area of the lens over which the objectionable skew distortion occurs. This design may have an additional advantage in that the width of the spherical near vision area, shown by the enlarged square portion of the grid, is increased over that of the previous examples.

Figure 9:
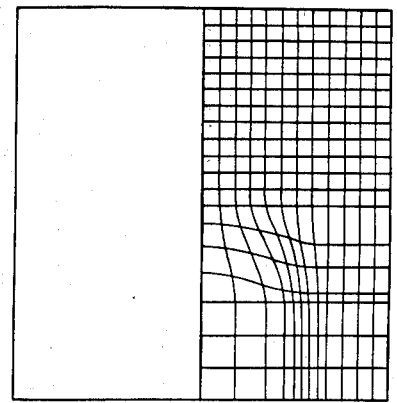

Referring now to the grid image shown in FIG. 9 of the drawing, here the lens refractive surface is designed to provide that the horizontal lines of the grid are bell-shaped as seen through the intermediate progressive power viewing zone of the lens. The laterally disposed blending areas are necessarily of substantial width and the surface within these areas is designed specifically to provide the smoothest optical effect as the line of sight moves from the center of the lens toward the periphery.

Figure 10:
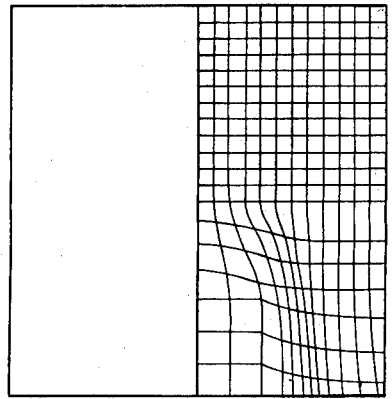

The lens which provides the image shown in FIG. 10 is very similar to that utilized for FIG. 9 except that the periphery of the near viwion area has been altered slightly in order to relieve the bunching of the horizontal lines that appear near the lower boundary of the intermediate area of the lens of FIG. 9. Obviously, in the lens utilized for FIG. 10, a controlled amount of skew distortion is introduced deliberately into the lower peripheral areas of the near vision viewing zone in order to relieve the bunching effect. While this initially appears somewhat objectionable as shown by the grid image of FIG. 10, it must be remembered that a typical ophthalmic lens is cut with an edge configuration to fit standard spectacle frames and that the majority of the corner portions of the grid of FIG. 10 will not be present in the completed ophthalmic lens. Therefore, this controlled amount of skew distortion is not considered to be objectionable.

Figure 11:
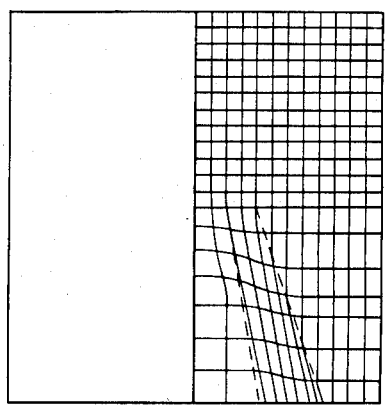

In each of the examples shown in FIGS. 6 through 10, it has been assumed that the blending areas ABCD and A'B'C'D' have vertical boundaries. It should be emphasized that as is shown in FIG. 5, the boundaries in question need not be vertical, and, in fact, there are specific advantages attributble to non-vertical orientation of the boundaries of the blending areas. An example of an image of a lens having such configuration is shown in FIG. 11. Here the boundaries are non-vertical as shown by the superimposed dotted lines spread out near the bottom of the lens. This provides a design that has the advantage that the distortion is kept to a minimum in the upper half of the intermediate viewing zone and at the same time provide a conveniently wide constant dioptric focal power near vision viewing area.

Therefore, it can be seen that in the foregoing examples acuity in the peripheral areas of the near vision viewing zone of the progressive power ophthalmic lens is sacrificed from that in the prior art designs in order to correct for skew distortion in the peripheral areas of the intermediate viewing zone of the lens. This is accomplished while succeeding in maintaining the constant dioptric focal power near vision area of the lens at acceptable proportions.

Thus far, the foregoing discussion has considered only those lenses that are symmetrical about a principal vertical meridional line, i.e., the principal vertical meridional line is in fact vertical on the surface of the ophthalmic lens and precisely divides the lens in symmetrical lateral portions. From the point in view of product inventory, such perfectly symmetrical lenses are extremely advantgeous. With proper marking applied, a symmetrical lens blank can then be used for either a left or right eye lens. Functionally, however, it is preferable to design the progressive power ophthalmic lenses separately for the left and right eyes respectively. The resulting lenses are asymmetrical since the interpupilary spacing of human beings decreases as their focus changes from distant objects to nearby objects. Therefore, in fitting the symmetrical lens to the patient, the principal meridional line of symmetry should be inclined approximately 10° from the vertical to provide an effective inset of the near vision viewing zone. This 10° rotation of the lens about its central point ensures that the line of sight can pass along the principal vertical meridional line for clear vision at all distances.

Figure 12:
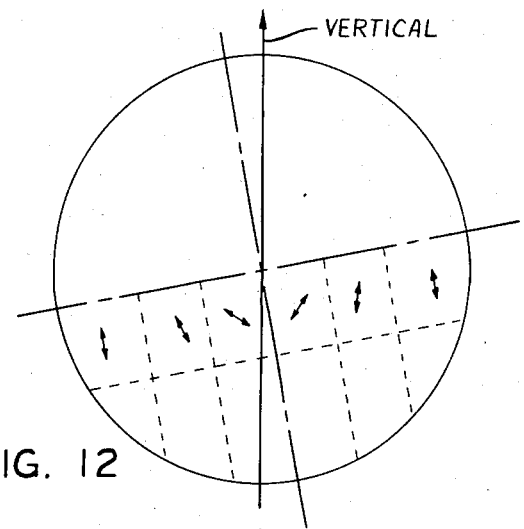
FIG. 12 is a schematic diagram of a symmetrical progressive power lens according to the invention which has been rotated 10° from the vertical to accomodate for decreasing interpupilary spacing when viewing closer objects.

However, once the lens has been rotated accordingly, the principal axes of stigmatism in the periphery of the symmetrical, skew distortion corrected lens described hereinabove are no longer aligned with the horizontal and vertical elements of the visual environment. Therefore, particularly in the case of those lenses with higher adds, this misalignment may result in noticeable incorporation of skew distortion throughout the peripheral areas of the ophthalmic lens. This, of course, would be objectionable for the identical reasons that those lenses of the prior art were objectionable to many wearers. Such a lens is shown in FIG. 12, where the orientation of a principal axis of astigmatism is shown at points in the various areas when the lens is rotated 10°.

Figure 13:
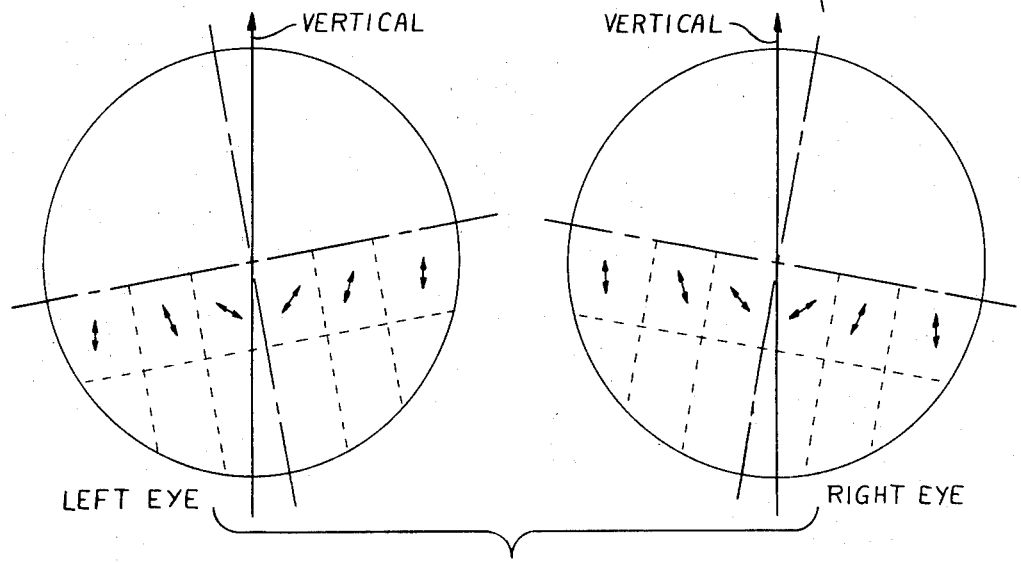
FIG. 13 is a schematic diagram of a matched set of progressive power lens which compensate for the 10° rotation required.

It is, therefore, included within the purview of the present invention to correct this situation by modification of the foregoing symmetrical design. In the modified versions, the far vision viewing zone and the central portions of the intermediate and near vision areas remain unchanged from the foregoing symmetrical design. However, the peripheral areas of the intermediate and near vision viewing zones are modified such that when the principal meridional line is inclined approximately 10° with respect to the vertical, the principal axes of astigmatism in these peripheral zones again are aligned with the horizontal and vertical elements in the visual environment. The blending areas are appropriately modified as well in order to provide a smooth optical correction between the central portions and the peripheral areas. FIG. 13 illustrates the orientation of the principal axes of the astigmatism at various locations for both a right and a left lens modified to compensate for the decreasing interpupilary spacing at near vision.

As was explained hereinabove, the prior art agrees quite generally on the conditions which exists along the principal vertical meridional line. The prior art consists largely of a series of attempts to acquire a means for generating the resulting aspherical surface. This generation problem caused certain limitations to exist in the design of the lens. The present lens has avoided this situation by discarding the requirement for ascertaining a precise means of generating directly a finished ophthalmic lens. The lenses according to the present invention may be formed directly or as cast lenses. The lenses are formed by programming initially a machine such as a numerically controlled milling machine to produce essentially the complement of the refrctive surface in a porous ceramic block. After the complementary surface is formed, a vacuum is applied to the back surface of the ceramic block and a sheet of highly polished glass is heated and slumped into the cavity formed in the ceramic block. This glass sheet may then be polished to form directly the refractive surface on a blank. Alternatively, the opposite side of the glass plate from that which comes into contact with the ceramic block may be used to form a mold surface for casting plastic lenses according to the present invention.

This casting technique has numerous advantages, not the least of which is that a lens comparable in price to present glass ophthalmic lenses may be produced. However, additional advantages inhere in the process due to the fact that the glass sheet slumped into the ceramic block has finite thickness. The finite thickness tends to blend any local discontinuities which may exist in the surface such as are produced between adjacent cuts of the grinding tool in the generating machine. The resulting lens has a smooth optical quality refractive surface thereon.

It can be shown that, when the power law within the intermediate progressive power viewing zone is linear, i.e., a constant rate of addition, as is the case for the power law of the progressive power lens shown in FIG. 3 of the drawing, the astigmatism increases with perpendicular distance from the principal vertical meridional line at twice the rate of add of dioptric power along the principal vertical meridional curve. Thus, if the add is B and the intermediate area is of height h, then the astigmatism A at a distance $|y|$ from the meridional line is given by $$A = 2(B/h)|y|$$

The "corridor of clear vision" is defined as that region of the intermediate viewing zone bounded on the right and left sides by lines having one diopter of astigmatism. (It is known that 1.0 diopters of astigmatism reduces visual acuity by approximately one-half). For example, if B equals 2.0D and $h$ equal 10mm, then from the foregoing equation, the width w of the corridor of clear vision is 5.0mm. From this typical example, it is clear that a considerable price is paid for the feature of progressive power in the intermediate viewing zone. That is, the visual acuity in the intermediate viewing zone is very poor everywhere except through a narrow central corridor, the width of which is controlled largely by the height of the intermediate viewing zone and the rate of add.

The difficulty of having narrow central corridor of clear vision can be at least partially relieved by combining the progressive power variation and finite power discontinuities at either or both of the boundaries separating the intermediate viewing zone from the far vision and near vision viewing zones. The solid curves shown in FIGS. 14A, 14B and 14C represent alternative progressive power laws incorporating such discontinuities. FIG. 14A shows the meridional power law of a progressive power ophthalmic lens according to the invention which has a power discontinuity, i.e., a jump, at the upper boundary of the intermediate viewing zone, but no such discontinuity at the lower boundary. In FIG. 14B, the situation is reversed with the power discontinuity occurring only at the lower boundary of the intermediate viewing zone. FIG. 14C shows the meridional progression of power in a lens having finite discontinuities at both the upper and lower boundaries of the intermediate viewing zone. In each of these examples, the dotted line superimposed on the power law diagram corresponds to the power law of a progressive power lens having no power discontinuities at the boundaries of the intermediate viewing zone.

A simple inspection of FIGS. 14A–14C provides a clear indication that the power law discontinuities have the precise effect of reducing the rate of addition of dioptric focal power across the intermediate viewing zone. Therefore, by the foregoing relationship, the corridor of clear vision is thus appreciably widened. If the power discontinuities have magnitudes $b_1$ and $b_2$, then, from the foregoing equation, the astigmatism inside the intermediate area will be given by $$A = 2(B - b_1 - b_2)/h \, |y|$$

Figures 14, 15:
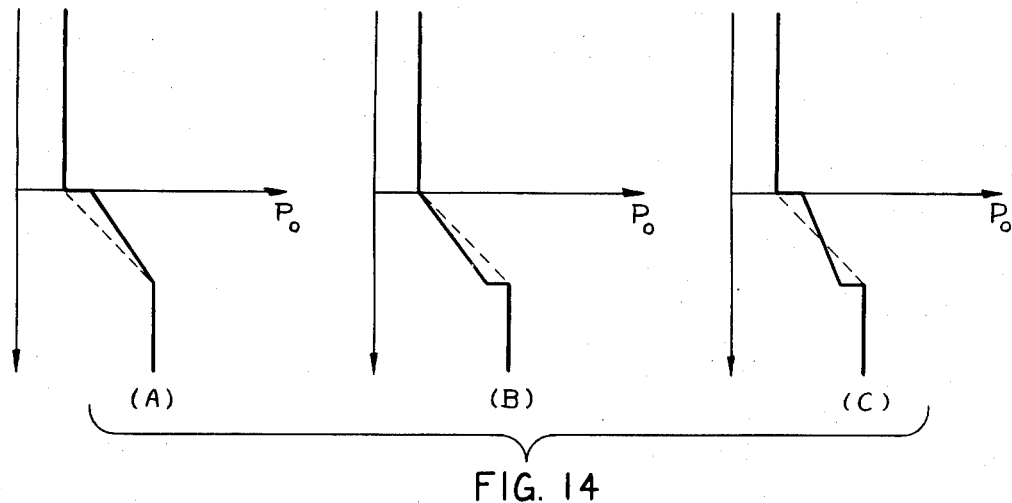
FIG. 15 is a table illustrating the effect of power law discontinuities.

Suppose that B once again equals 2.0D, h equals 10mm, and $b_1$ and $b_2$ equals 0.5D each. Now the width w of the corridor of vision becomes 10mm. This is a 100 percent improvement in width over the case of a continuous power law previously described, i.e., where $b_1 = b_2 = 0$. The table of FIG. 15 gives the width of a corridor of clear vision for various total additions B and total discontinuous power variations $(b_1 + b_2)$ as the top number in each block. The lower number is the percentage increase of $w$ over the width associated with a continuous power law.

The magnitude of an individual power discontinuity should not be so great as to destroy the wearer's sense of visual continuity intended by the concept of progressive power. This criteria would probably limit such individual discontinuities to about 0.5 diopters. However, it is intended that discontinuities greater than 0.5 diopters be included within the purview of the present invention.

Figure 16:
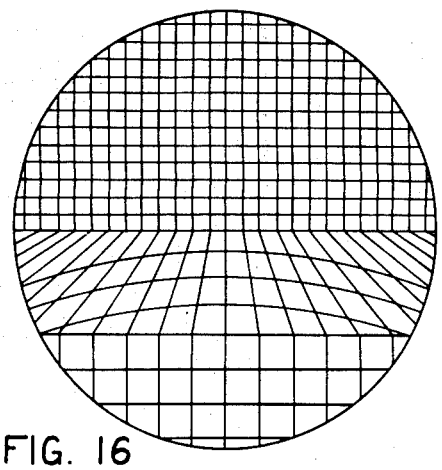
FIG. 16 is an illustrative diagram of the image of a square grid as viewed through a progressive power lens having no finite power discontinuities at the boundaries of the intermediate viewing zone.
Figure 17:
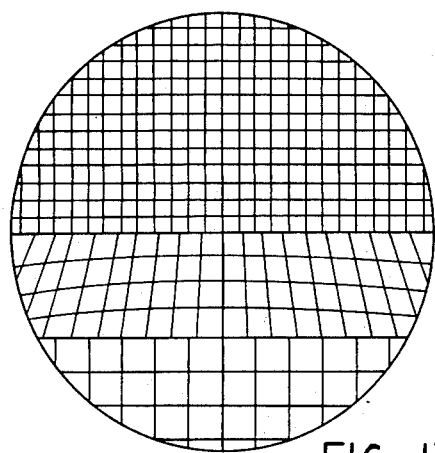
FIG. 17 is an illustrative diagram of the image of a square grid as viewed through a progressive power lens having finite power discontinuities at the boundaries of the intermediate viewing zone.

The use of power discontinuities also helps to reduce the distortion through the intermediate viewing zone. FIG. 16 shows the distortion of a square grid as viewed through a progressive power ophthalmic lens having a continuous power law. This image is similar to the grid which would be observed through a progressive power lens such as shown in FIG. 3. On the other hand, FIG. 17 shows the distortion of the same grid when viewed through a progressive power lens having finite power discontinuities at both the upper and lower boundaries of the intermediate progressive power zone. In both cases the power law within the intermediate viewing zone is linearly increasing and the total add is equal. Obviously, the distortion of the grid within the intermediate viewing zone in the lens shown in FIG. 17 is markedly less than that of the lens shown in FIG. 16.

If a progressive power lens as defined in the prior art were to have incorporated therein finite power discontinuities, the price paid for such discontinuities would be the appearance of a ledge, i.e., a distinct break in the surface continuity extending across the surface of the lens at the level of the power discontinuity. If, for example, the axis of the generating circle as defined in FIG. 4 is vertical, the ledge associated with a power discontinuity would make a horizontal line across the lens. The height L of this ledge grows approximately quadratically with distance $|y|$ from the meridional line according to the following relationship $$L = \tfrac{1}{2} b/n - l\, y^2$$

Figure 18:
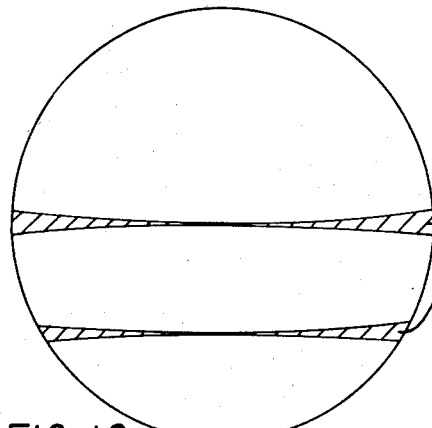
FIG. 18 is a front elevation view of a progressive power ophthalmic lens in which finite power discontinuities at the boundaries of the intermediate viewing zone are blended to render them invisible.

For example, if b equals 0.5D and n equals 1.5, than at $|y|$ equal to 35mm, L equals 0.62mm. If the cosmetic advantages of progressive power lenses are to be maintained, this ledge would then have to be blended into the viewing zones which it separates. This would be extremely difficult in the prior art progressive power lenses. However, with the process of sagging mold surfaces utilized in the present invention, the blending occurs automatically by virtue of the finite thickness of the sheet of glass utilized to form the mold surface. The resulting lens then contains blended areas 60 of rapidly changing power as indicated in FIG. 18. These areas are not likely to be troublesome visually since they are adjacent to those portions of the intermediate viewing zone where the visual acuity is already severely diminished by surface astigmatism.

As previously stated, two types of advantages inhere to lenses of the general class including the present invention. These are continuous accomodations throughout the height of the lens, an optical advantage, and invisible dividing lines between the various viewing zones of the lens, a cosmetic advantage. It has been shown that a price is paid for the advantage of progressive accommodation along the principal vertical meridional curve, that is, in the intermediate viewing zone visual acuity is diminished severely except along a relatively narrow corridor of clear vision centered on the principal meridional line. If, however, the wearer is willing to sacrifice the advantage of progressive accomodation, it becomes possible utilizing power discontinuities to substantially widen the corrider of clear vision and still retain the cosmetic advantage which adheres to progressive power ophthalmic lenses.

For example, in an ordinary solid type trifocal lens which is commonly commercially available today, the dividing lines between the far, intermediate, and near vision segments are highly visible. This is caused by the presence of ledges at the dividing lines wich grow quadratically in height with the distance from the center principal meridional line. The ledge height is confined to zero at the principal meridional line but the ledge height at a distance of 35mm from the principal meridional line where the change in focal power between adjacent segments is 1.0D, is 1.24mm. A ledge of this height is highly visible and no method of manufacture including the sagging block method described hereinabove can effectively hide such a ledge.

It is, however, within the purview of the present invention to form a multifocal lens wherein the theoretical ledge height is restricted to some minimum value which can be effectively blended out through the sagging process of manufacture.

Figure 19:
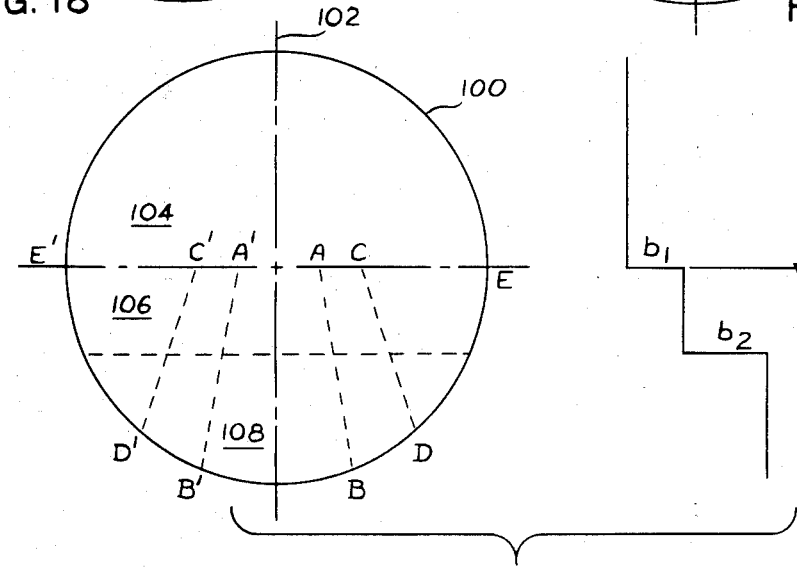
FIG. 19 is a front elevation view of a multifocal ophthalmic lens according to the present invention whose intermediate and near vision segments are divided laterally into a plurality of areas, the outermost of which exhibits only normal distortion, the lens being susceptible to a manufacturing process for blending out the segment dividing lines.

Such a multifocal lens is shown in FIG. 19 of the drawing. The meridional power law has the stepwise form of the ordinary trifocal and is shown at the right of FIG. 19. if $b_1$ and $b_2$ are the values of the power discontinuity steps and B is the total add, then $$B = b_1 + b_2.$$

In the case where either $b_1$ or $b_2$ equals 0, the lens simply becomes a bifocal ophthalmic lens. The mulifocal lens 100 shown in FIG. 19 is formed of a constant dioptric focal power distance viewing zone 104, a second viewing zone 106 disposed directly below the distance viewing zone 104, and a third viewing zone 108 at the bottom for viewing nearby objects. Once again, the intermediate and nearer viewing portions are divided laterally into at least three, and preferably five areas. The central area ABB'A' is centered on the principal vertical meridional line 102 and is comprised of two constant dioptric focal power areas obeying the power law shown at the right of FIG. 19. Adjacent to the central zone are blend areas ACDB and A'C'D'B'. These areas of blend perform the same function as those areas of blend shown in FIG. 5 for the progressive power lens. Similarly, peripheral zones CDE and C'D'E' also are again corrected for skew distortion in the manner described hereinabove. In these peripheral areas of the intermediate and near vision zones, a vertical line of the environment is viewed through the lens as an unbroken vertical line from the top to the bottom of the lens. In other words, along any vertical line drawn through the periphery of the lens, the amount of horizontal prism is constant.

The condition of verticality of lines used for the periphery of the lens is equivalent to the correction of skew distortion, which in the case of ordinary solid type trifocals is concentrated at the horizontal ledges that are associated with the various power steps.

Figure 20:
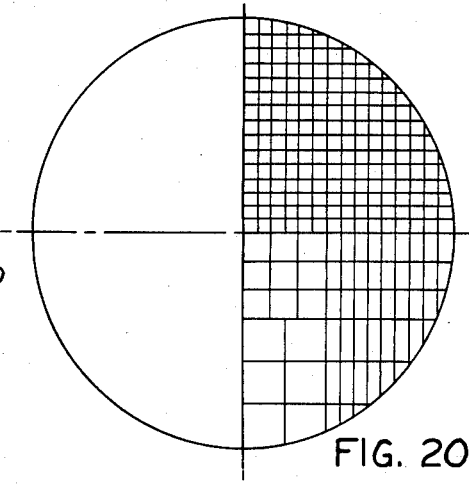
FIG. 20 is an illustrative diagram of the image of a square grid as viewed through a multifocal lens of the present invention.
Figure 21:
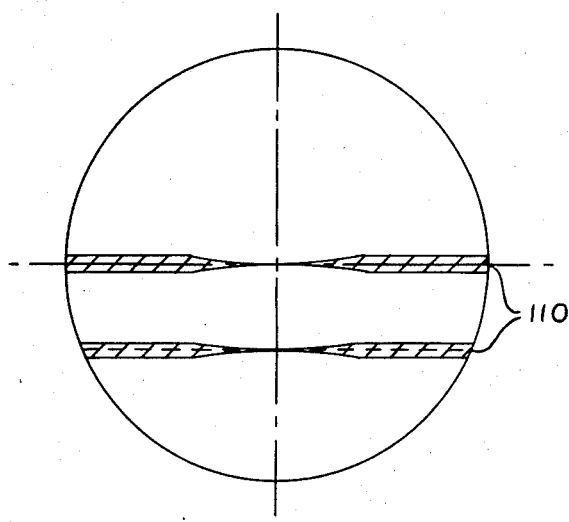
FIG. 21 is a front elevational view of the multifocal lens used for FIG. 20 in which the surface discontinuities at the boundaries between segments are blended to render them invisible.

The principle advantage arising from the correction of skew distortion is the reduction of the height of the horizontal ledges. The ledges are not removed entirely but the height that remains can be rendered cosmetically invisible by use of the sagging method of manufacture. For example, consider the type of distortion correction in which the width of the blending areas ABDC and A'B'D'C' are reduced to 0, i.e., the blending is done abruptly. The distortion of a squared grid as seen through such a multifocal lens is illustrated in FIG. 20 of the drawing. Suppose that the width of the central region A' AB B' is taken as 24mm. If the change in dioptric focal power at the boundaries of the intermediate zone is taken as 1.00D, then, the ledge height L where $|y|$ equals 12mm, is 0.14mm. The ledge height L where $|y|$ is greater than 12mm remains constant and equal to 0.14mm. Although on a generated lens, a ledge of this height would still be easily visible, the height L is not so great that it cannot be smoothed out and made cosmetically invisible in the foregoing sagging method of manufacture. The area of blend produced by this process is indicated at 110 in FIG. 21 of the drawing.

The type of multifocal lens thus produced compares favorably to the segment type multifocal currently available. However, the dividing lines between the various portions of the lens are not visible in the lens according to the present invention as they are in the segment type multifocal lens.

Throughout the foregoing discussion of the various features of the invention, the various features of the lenses according to the invention have been discussed independently. That is, the vertical discontinuities concept has been discussed separately from the feature of dividing the lens horizontally into areas which are treated separately in order to correct for skew distortion. It is, however, included within the purview of the invention to combine these various features in various combinations in order to provide optimal performance of a progressive power ophthalmic lens for particular ophthalmic requirements.

A detailed description of the design and manufacture of a progressive power lens of the type depicted in FIG. 11 will now be given. The lens is to be made of plastic, cast in a mold made by the slumping process described above.

Figure 23:
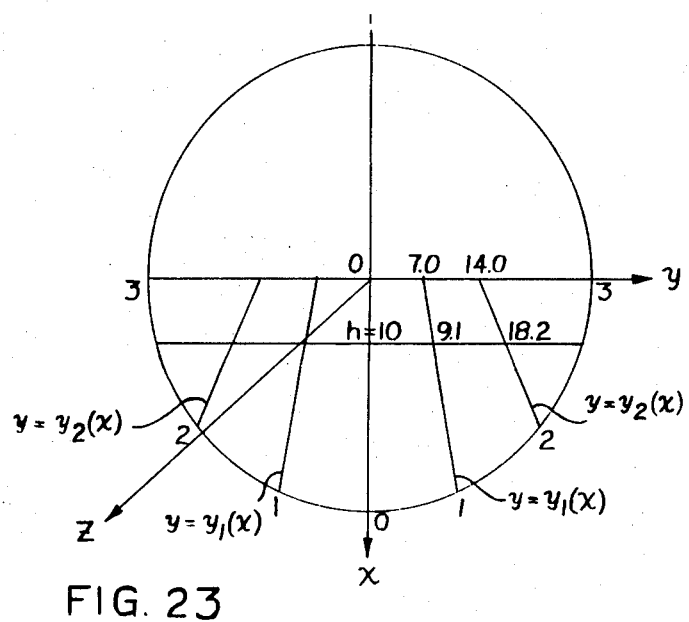
FIG. 23 is a front elevation view of a lens mold or block showing the concave surface of the mold or block.

Therefore, in the manner of design, what is needed is a detailed description of the surface of the ceramic block on which the glass mold is to be slumped. The curvatures of the block must be such that the resultant mold produces the lens depicted in FIG. 11. The rectangular coordinate system used is shown in FIG. 23. This view shows the concave surface of the block. The surface is tangent to the xy plane at the origin O. That portion of the block corresponding to the distance portion of the mold and lens lies above the yz plane. Those portions that correspond to the intermediate and reading areas lie below that plane. The intermediate area is of height h. The block is symmetrical about the xz or meridonal plane. On the lower half of the block, the lateral blending zone on the right-hand side is bounded on the left and right by the curves $y = y_1(x)$ and $y = y_2(x)$, and the lateral blending zone on the left hand side is bounded on the right and left by the curves $y = y_1(x)$ and $y = y_2(x)$. The radius of curvature of the spherical distance portion of the block is $r_D$, that of the spherical reading portion $r_R$. In general, the radius of curvature at a point x on the vertical meridian is given by $r = r(x)$. The form of the surface of the block, expressed as an elevation $z = f(x,y)$ above the xy plane, is given by the set of equations presented earlier, viz. Equation (3) and subsequent related expressions.

Restating these equations employing terms previously utilized and employing certain terms which further simplify the mathematics, we obtain:

$$z = \int_0^x \frac{Q}{(1-Q^2)^{\frac{1}{2}}} dx + (r^2 - u^2)^{\frac{1}{2}} - \left[ r^2 - u^2 - y^2 + (1 - \frac{r}{r_D}) K(x,y) \right]^{\frac{1}{2}}$$

where the functions Q, r and u have their previous meanings, and $K = 0$ in the central portion of the slumping block, $K = y^2 - n$ in the peripheral portions of the slumping block, $K = 1(y-y_1)^3 - m(y-y_1)^4$ in the blend zones of the block where l, m, and n are identical to that which was given earlier.

As noted in the foregoing paragraph these equations define the surface of the ceramic block against which the mold is slumped employing a process previously described and to be further detailed. The glass employed is an ophthalmic crown glass, which is placed on this ceramic block defined by the equations presented and the combination is inserted into an oven which is heated as follows. The temperature is raised in the oven to a maximum temperature of approximately 1210 degrees fahrenheit over a period of time of approximately four hours. The temperature in the oven is contained at this value for approximately one hour. Then, approximately eight hours are utilized to reduce the temperature in the oven from this value downward.

Figure 24:
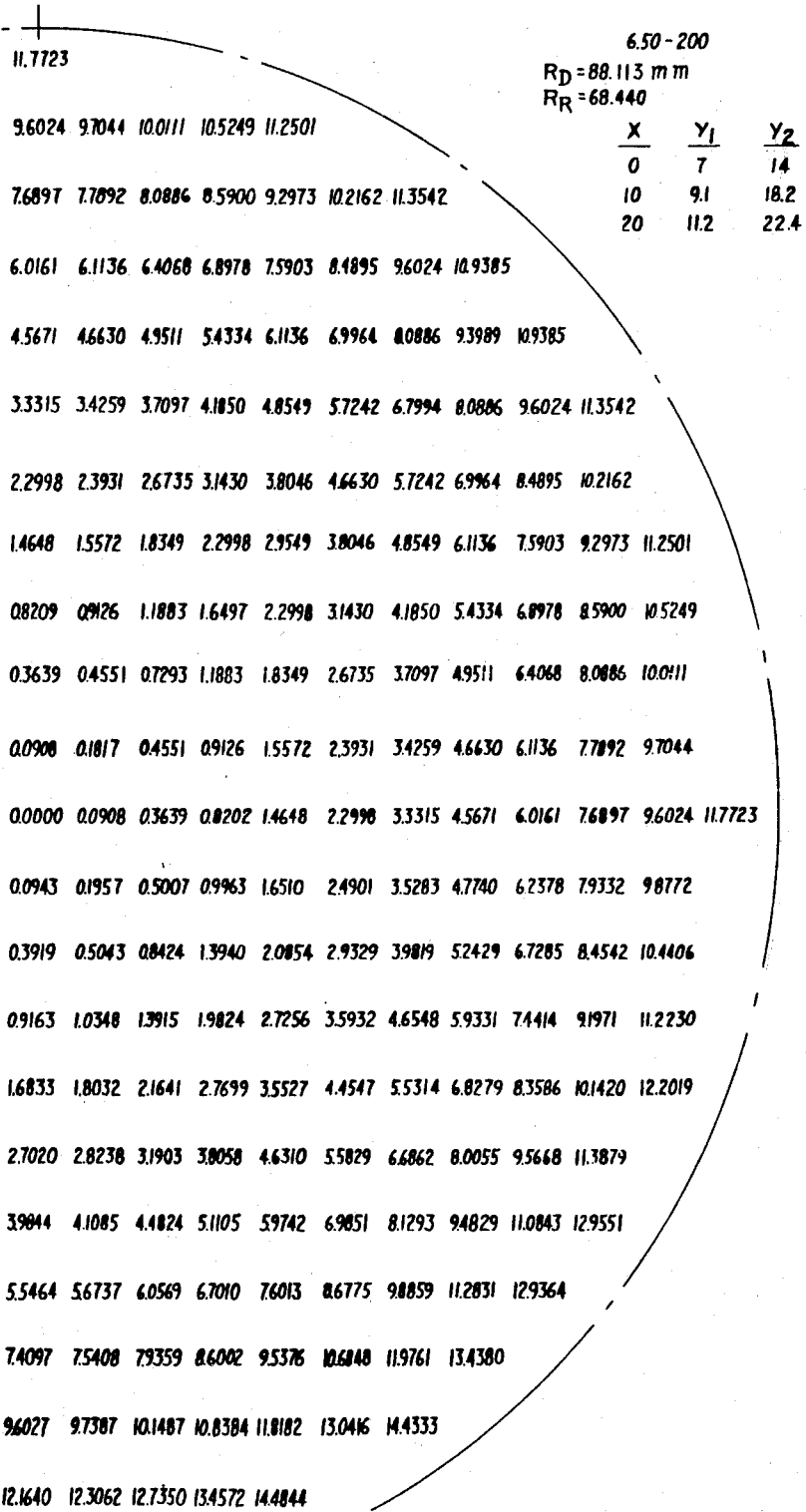
FIG. 24 is an exemplary embodiment of a surface shape which may be provided upon a slumping block used to form a mold for casting a lens according to principles of the present invention.

By way of example, with regard to FIG. 24 let it be required to manufacture a CR-39 plastic ophthalmic lens having a distance portion with convex radius of curvature 83.33 mm and having a reading addition of 2.00 diopters. The mold will be slumped starting with a meniscus glass blank having surface powers of +6.00 and −6.37 diopters and having a center thickness of 4.0 mm. It has been determined that in order to obtain a lens with the stated refractive characteristics and using a glass slumping blank of the above description, the radii of curvature of the spherical portions of the block have to be 88.113 mm, and 68.440 mm, for the spherical distance area and for the spherical reading area respectively. Assuming that the rate of add at the principal meridional line inside the intermediate area is linear, the curvature law for the intermediate area may be written:

$$\frac{1}{r} = \frac{1}{r_D} + \left(\frac{1}{r_R} - \frac{1}{r_D}\right)\frac{x}{h}$$

If $h = 10.0$ mm, this law becomes for the above radii $(1/r) = (11.3491 + 0.3262\ x)\ 10^{-3}$, mm$^{-1}$.

The lines $y_1$ and $y_2$ are chosen to be straight lines with the following coordinates

| x (mm) | $y_1$ (mm) | $y_2$ (mm) |
|---|---|---|
| 0 | 7.0 | 14.0 |
| 10 | 9.1 | 18.2 |

The equations of these lines are thus $y_1 = 7.00 + 0.21\ x$      (mm)

$Y_2 = 14.0 + 0.42\ x$      (mm)

These values of $r_D$, $r_R$, $r$, $y_1$, and $y_2$ may now be substituted into the equations of the surface. A computer was programmed in accordance with the above equations and input data to guide a cutting tool which generates the required surface onto the ceramic slumping block. FIG. 24 shows the results of the electronic computer evaluation employing the above input data which gives the elevation of the surface of the slumping block at 4 mm intervals over the area of a block 86 mm in diameter. Only one-half of the block is depicted. The other half of the block is not depicted since it is an essential mirror image of the half presented. Each number represents the z-direction distance from the surface of the block, at the center of the cell in which the number appears, to the xy plane that is tangent to the surface of the block at the center of the cell designated 0.0000. The vertical meridian 52 of FIG. 5 would therefore intersect the center of the cell designated 0.0000 as well as the centers of the cells directly above and below this central grid, i.e.: the centers of cells bearing measurements: 0.0908, 0.3639, 0.0943, 0.3919, etc. This particular exemplary embodiment applies to a ceramic slumping block having distance and near-zone radii of 88.113 and 68.440mm which is used to slump a mold for casting a plastic lens of the form depicted in FIG. 11 having a distance radius of 83.33 mm and a reading addition of 2.00 diopters.

Although the foregoing mathematical and textual description is sufficiently precise and accurate for one to construct a progressive power lens in accordance with the principles of my invention, and athough the exemplary embodiment as shown in FIG. 24 is derived from a computer analysis of the equations presented thus far, there is another mathematical formulation based on surfaces of revolution which can be employed to help conceptualize or understand the principles involved. However, since these other mathematical formulations may not lend themselves readily to computer analysis, they are presented merely as a tool of insight and to provide another point of view.

To begin with, to correct for skew distortion in peripheral areas of the progressive power zone, one requires that vertical and horizontal lines in the environment are perceived by the wearer of a skew-distortion corrected lens as being respectively vertical and horizontal. This correction can be achieved by requiring that these peripheral areas comprise portions of a surface of revolution. The axis of the surface of revolution is vertical, and lies in the vertical meridional plane. By symmetry it should be clear that the principal axes of astigmatism at every point of such a surface of revolution lie in horizontal and vertical planes. Therefore, when the peripheral areas of the lens have this form, only pure normal distortion may be perceived through those area.

Figure 22:
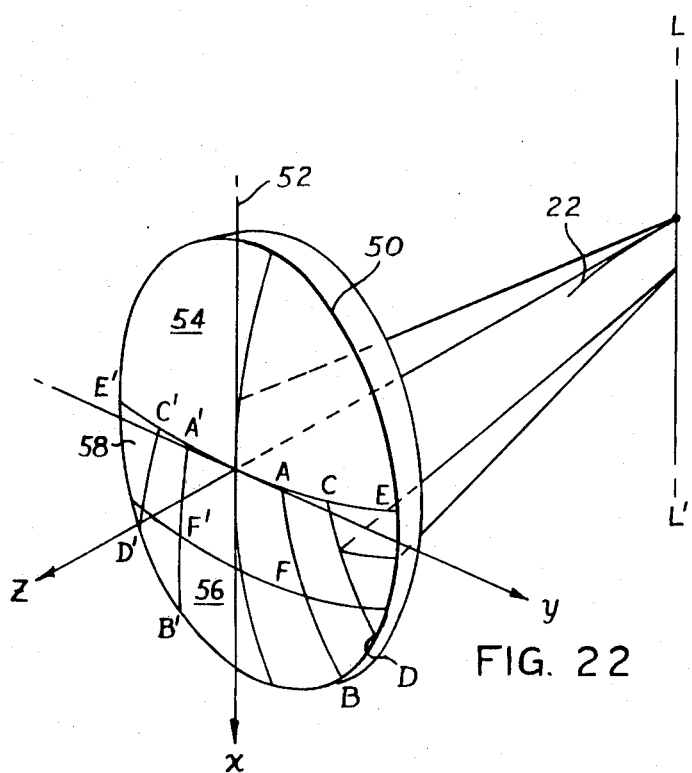
FIG. 22 is a perspective elevation view of a progressive power ophthalmic lens on which the surfaces of the lateral peripheries are illustrated as being constructed in accordance with portions of a figure or surface of revolution.

Referring to FIG. 5 and FIG. 22, the peripheral areas of the refractive surfce CDE and C'D'E' are portions of a surface of revolution whose axis LL' is vertical and lies in the vertical meridional plane. For the situation where the entire distance portion, comprising the upper half of the lens, is spherical, the axis of revolution for peripheral regions CDE and C'D'E' passes through the center of curvature of the distance viewing zone. If the axis were to pass through any other point of the evolute 22, it would not be possible to smoothly connect the lower half of the lens with the spherical upper half. In other words, because the equatorial dividing line EE' is circular, the axis of revolution for the peripheries of the lower half of the lens must pass through the center of that circle.

Further in connection with FIG. 22, in designing such a lens the locations of the lateral dividing lines AB, CD, A'B', and C'D' are first decided upon. Then with the knowledge that peripheral areas are to be portions of a figure or surface of revolution, the lateral blending zones are designed in such a way that the smoothest possible connection is achieved between the central and peripheral portions of the lens. The peripheral regions are then formed by rotating the boundary curves CD and C'D' about the rotation axis LL' of FIG. 22. The general set equations applicable to a lens of the type depicted in FIG. 11, or to a slumping block that may be used to make such a lens, will now be given. These equations express the elevation $z = f(x,y)$ of the surface above the $xy$ plane. They give explicitly the form of the rotationally symmetric peripheral zones.

For the spherical distance zone, $$z = r_D - (r_D^2 - x^2 - y^2)^{1/2}.$$

For the central portion of the lower half of the lens or block, including both the intermediate and reading levels $$z = f_{01}(x,y),$$

$$= \int_0^x \frac{Q}{(1-Q^2)^{\frac{1}{2}}} dx + (r^2 - u^2)^{\frac{1}{2}} - (r^2 - u^2 - y^2)^{\frac{1}{2}},$$

where $u = Qr$,
and $$Q = \int_0^x \frac{dx}{r}.$$

For the rotationally symmetric peripheral areas of the lower half of the lens or block, $$z = f_{23}(x,y)$$
$$= r_D - [(r_D - z_2)^2 + y_2^2 - y^2]^{\frac{1}{2}},$$
where $z_2 = f_{01}(x,y_1) + (r_b^2 - y_1^2)^{\frac{1}{2}} -$
$$(r_b^2 - y_2^2)^{\frac{1}{2}} + \frac{1}{2}(\frac{1}{r} - \frac{1}{R_D})y_1(y_2 - y_1).$$

For the blending areas between the central and peripheral areas, $$z = f_{12}$$
$$= A f_{01} + B f_{23}.$$
$$A = a(y_2 - y)^3 + b(y_2 - y)^4 + c(y_2 - y)^5,$$
$$B = a(y - y_1)^3 + b(y - y_1)^4 + c(y - y_1)^5,$$
and $a = \dfrac{10}{(y_2 - y_1)^3}$, $b = \dfrac{-15}{(y_2 - y_1)^4}$, $c = \dfrac{6}{(y_2 - y_1)^5}$.

These equations, while providing an exact description of the geometrical properties required of the lens or block, and which are mathematically descriptive of the portions of the surface of revolution earlier referred to, are nevertheless quite complicated and are resistant to ready numerical evaluation. Therefore, the former simpler set of mathematical equations were used to generate the exemplary embodiment of the present invention as depicted in FIG. 24 herein.

Referring more particularly to the type of lens depicted in FIG. 19, such a lens is distinguished from prior art lenses that involve blending in that there is no prism jump in the image as the line of sight moves along the principal vertical meridian.

Figure 25:
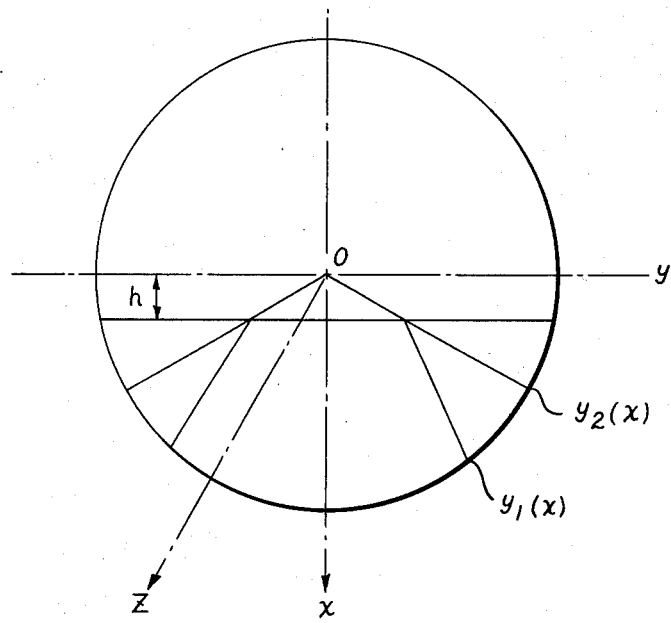
FIG. 25 is an illustration of a rectangular coordinate system which may be used to produce a ceramic block slumping surface for making glass molds useful in the casting of lenses not having continuously variable optical power zones along the principal vertical meridian.

Let it now be required to manufacture a blended multifocal of this type. The lens is to be CR-39, cast in a glass mold which is made by slumping into a forming block of ceramic material. A general mathematical description of the surface contour of the ceramic slumping block may be given as follows wherein the rectangular coordinate system used is shown in FIG. 25:

The layout and orientation of the block with respect to the coordinate system is the same as for the previous examples of progressive power lenses, except that the locations and shape of the curves $y_1(x)$ and $y_2(x)$ are different. The radii of curvature of the spherical distance, intermediate and reading areas are $r_D$, $r_I$ and $r_R$ respectively. The form of the block surface is expressed as the height $Z$ above the x-y plane.

For the spherical distance zone, which occupies the upper half of the block and lens, $$Z = r_D - (r_D^2 - x^2 - y^2)^{1/2}$$

For the central region of the intermediate level $$Z = f_{01}^{(I)}(x)$$
$$= r_I - (r_I^2 - x^2 - y^2)^{\frac{1}{2}}$$

For the peripheral region of the intermediate level $$Z = f^{(I)u}{}_{23}(x)$$
$$= r_D - [(r_D - Z_2)^2 + y_2^2 - y^2]^{\frac{1}{2}}$$

where $$Z_2 = r_I - (r_I^2 - x^2 - y_1^2)^{\frac{1}{2}} + (r_b^2 - y_1^2)^{\frac{1}{2}} -$$

$$(r_b^2 - y_2^2)^{\frac{1}{2}} + \frac{1}{2}\left(\frac{1}{r_I} - \frac{1}{r_D}\right) y_1(y_2 - y_1)$$

For the lateral blending areas of the intermediate level $$Z = f_{12}^{(I)}(x)$$
$$= A f_{01}^{(R)} + B f_{23}^{(I)}$$

where A and B are as previously defined in connection with the progressive power lenses.

For the spherical central area of the reading level, $$Z = f_{01}^{(R)}(x,y)$$
$$= r_I - (1 - \frac{r_R}{r_I})(r_I^2 - h^2)^{\frac{1}{2}} -$$

$$\left\{ r_R^2 - \left[ x - h(1 - \frac{r_R}{r_I}) \right]^2 - y^2 \right\}^{\frac{1}{2}}$$

For the peripheral region of the reading level $$Z = f_{23}^{(R)}(x,y)$$
$$= r_D - [(r_D - z_2)^2 + y_2^2 - y^2]^{\frac{1}{2}}$$

where $$Z_2 = f_{01}^{(R)}(x,y_1) + (r_b^2 - y_1^2)^{\frac{1}{2}} - (r_b^2 - y_2^2)^{\frac{1}{2}} +$$

$$\frac{1}{2}\left(\frac{1}{r_R} - \frac{1}{r_D}\right)y_1(y_2 - y_1)$$

For the lateral blending area of the reading level $$Z = f_{12}^{(R)}(x,y)$$
$$= A f_{01}^{(R)} + B f_{23}^{(R)}$$

where A and B are as defined above.

A less exact but simpler set of equations for the surface is as follows.

The equation of the spherical distance remains the same as above.

For the lower half of the block $$Z = f(x,y) = w - [r^2 - (x - u)^2 - (y - v)^2]^{\frac{1}{2}}$$

where,

For the intermediate level, $r = r_I$
$u = 0$
$(y - v)^2 = y^2$ central region
$\qquad = y^2 - (1 - \frac{r_I}{r_D})l' (y - y_1)^2$ lateral blending zone
$\qquad = y^2 - (1 - \frac{r_I}{r_D})(y^2 - n')$ peripheral zone
$w = r_I$ And for the reading level, $r = r_R$
$u = h(1 - \frac{r_R}{r_I})$
$(y - v)^2 = y^2$ central zone
$\qquad = y^2 - (1 - \frac{r_R}{r_D})l' (y - y_1)^2$ lateral blending zone
$\qquad = y^2 - (1 - \frac{r_R}{r_D})(y^2 - n')$ peripheral zone In these equations
$h$ = height of intermediate area
$r_D$ = distance radius
$r_I$ = intermediate radius
$r_R$ = reading radius
$l' = y_2/(y_2 - y_1)$
$n' = y_1 y_2$
$y_1 = y_1(x)$
$y_2 = y_2(x)$ A numerical example will now be given. The lens is to be a bifocal, with a spherical distance portion of radius 83.33 mm and with a reading addition of 2.00 diopters. Using the same glass slumping blank as was used for the examples of the progressive power lenses, the following values of the block radii are required to produce a CR-39 lens with the required optical characteristics:

$r_D$ = 88.113 mm $r_I$ = 68.440 mm $r_R$ = 68.440 mm

The lines $y_1$ and $y_2$ between which lateral blending occurs are shown in FIG. 25. These lines, being composed of sections of straight lines are defined by the following coordinate points:

| x(mm) | Y₁(mm) | Y₂(mm) |
|---|---|---|
| 0 | 0 | 0 |
| 6.8 | 14.0 | 14.0 |
| 13.6 | 17.5 | 28.0 |

The equations of the lines $y_1$ and $y_2$ are

| | | | |
|---|---|---|---|
| Y₁ = 2.06x | (mm) | 0 ≦ | x ≦ 6.8 |
| = 0.51 × + 10.53 | (mm) | | x ≧ 6.8 |
| Y₂ = 2.06x | (mm) | all | x |

The height h is taken to be 6.8 mm.

These numerical values of $r_D$, $r_I$, $r_R$, $h$, $y_1$ and $y_2$ are put into an electronic computer which, with the simplified set of equations defined above, has been programmed to calculate the surface elevation Z of the ceramic block at 4 mm intervals over the area of a block 86 mm in diameter. The results of the computation are shown in FIG. 26.

While there have been shown and described what are considered to be preferred embodiments of the present invention, it will be obvious to those skilled in the art that various changes and modifications may be made therein without departing from the invention as defined in the appended claims.

I claim:

1. A multifocal ophthalmic lens having invisible divisions between viewing zones comprising a lens body having a refractive surface being characterized by a smooth, unbroken principal meridional curve lying along the refractive surface in a generally vertical direction and dividing the refractive surface into two similar lateral portions, the curvature of the principal meridional curve varying to provide a predetermined plurality of levels of constant dioptric focal power according to a predetermined law thereby dividing the refractive surface into a like plurality of viewing zones in vertical juxtaposition, each pair of juxtaposed viewing zones having a boundary therebetween, the uppermost viewing zone having a first constant dioptric focal power and being adapted for viewing distant objects over the full width of the multifocal ophthalmic lens, the remaining viewing zones being divided into at least three horizontally disposed areas, the centermost area in each of the remaining viewing zones being of a constant dioptric focal power higher than the constant dioptric focal power at the principal meridional curve in the viewing zone juxtaposed thereabove, the two outermost of said areas in each of the remaining viewing zones being of such aspherical curvature that at a boundary the relative heights of the viewing zones forming the boundary are constant along the boundary throughout the width of each outermost area and each having a surface curved substantially in accordance with the equation $$(\delta^2 Z/\delta x \, \delta y) =$$

where $y$ and $x$ represent horizontal and vertical directions respectively which define a plane, and Z is height of said curved surface from said plane, said surface comprising a portion of a surface of revolution whose axis of revolution is vertical and lies in a common plane with said principal meridional curve to optically compensate for skew distortion so that at all points thereon the principal axes of astigmatism lie in vertical and horizontal planes to permit a wearer of the lens to perceive horizontal and vertical lines in the visual environment as being horizontal and vertical, and the boundaries between the viewing zones being blended by sagging process so that all connections between viewing zone surfaces are continuous and boundaries of the zones are invisible.

2. A multifocal ophthalmic lens according to claim 1 in which the predetermined law defines a vertical magnification at each point along the principal meridional curve, the vertical magnification being substantially constant throughout the entire width of the lens along lines perpendicular to said principal meridional curve and extending from said points across said width of the lens.

3. A multifocal ophthalmic lens according to claim 1, in which the horizontal magnification in the two outermost of the three areas is equal to the magnification of the uppermost viewing zone.

4. A multifocal ophthalmic lens according to claim 1, in which there are three viewing zones.

5. A multifocal ophthalmic lens according to claim 1, in which an additional area is interposed in each of the remaining viewing zones between the center area and each of the two outermost areas, the refractive surface in the additional areas being aspherical and providing optical blending between the center area and each of the two outermost areas whereby the wearer of the lens perceives a smooth transition when scanning his line of sight laterally toward one of the outermost areas.

6. A multifocal ophthalmic lens having invisible divisions between viewing zones comprising a lens body having a refractive surface being characterized by
- a smooth, unbroken principal meridional curve lying along the refractive surface in a generally vertical direction and dividing the refractive surface into two similar lateral portions, the curvature of the principal meridonal curve varying to provide a predetermined plurality of levels of constant dioptric focal power according to a predetermined law thereby dividing the refractive surface into a like plurality of viewing zones in vertical juxtaposition, each pair of juxtaposed viewing zones having a boundary therebetween,
- the uppermost viewing zone having a first constant dioptric focal power and being adapted for viewing distant objects over the full width of the multifocal ophthalmic lens,
- the remaining viewing zones being divided into at least three horizontally disposed areas,
- the centermost area in each of the remaining viewing zones being of a constant dioptric focal power higher than the constant dioptric focal power at the principal meridional curve in the viewing zone juxtaposed thereabove,
- the two outermost of said areas in each of the remaining viewing zones being of such aspherical curvature that at a boundary the relative heights of the viewing zones forming the boundary are constant along the boundary throughout the width of each outermost area and each having a surface curved substantially in accordance with the equation $$(\delta^2 Z/\delta x \, \delta y) = 0$$

where $y$ and $x$ represent horizontal and vertical directions respectively which define a plane, and $Z$ is height of said curved surface from said plane, to optically compensate for skew distortion so that all points thereon the principal axes of astigmatism lie in vertical and horizontal planes to permit a wearer of the lens to perceive horizontal and vertical lines in the visual environment as being horizontal and vertical and
- the boundaries between the viewing zones being blended by sagging process so that all connections between viewing zone surfaces are continuous and boundaries of the zones are invisible.

7. A multifocal ophthalmic lens according to claim 6, in which the predetermined law defines a vertical magnitification at each point along the principal meridional curve, the vertical magnitification being substantially constant throughout the entire width of the lens along lines perpendicular to said principal meridional curve and extending from said points across said width of the lens.

8. A multifocal ophthalmic lens according to claim 6, in which the horizontal magnification in the two outermost of the three areas is equal to the magnitification of the uppermost viewing zone.

9. A multifocal ophthalmic lens according to claim 6, in which there are three viewing zones.

10. A multifocal ophthalmic lens according to claim 6, in which an additional area is interposed in each of the remaining viewing zones between the center area and each of the two outermost areas, the refractive surface in the additional areas being aspherical and providing optical blending between the center area and each of the two outermost areas whereby the wearer of the lens perceives a smooth transition when scanning his line of sight laterally toward one of the outermost areas.

* * * * *